United States Patent [19]
Laskey

[11] Patent Number: 5,868,032
[45] Date of Patent: Feb. 9, 1999

[54] BALL SCREW AND NUT LINEAR ACTUATOR ASSEMBLIES AND METHODS OF CUSHIONING THEIR TRAVEL

[75] Inventor: David Ray Laskey, Bay City, Mich.

[73] Assignee: Thomson Saginaw Ball Screw Company, LLC, Saginaw, Mich.

[21] Appl. No.: 824,963

[22] Filed: Mar. 27, 1997

Related U.S. Application Data

[60] Provisional application No. 60/014,835 Apr. 4, 1996.

[51] Int. Cl.[6] ............................... F16H 27/02; F16F 9/38
[52] U.S. Cl. ................. 74/89.15; 74/459; 74/424.8 NA; 188/322.12
[58] Field of Search ........................ 74/89.15, 424.8 NA, 74/459, 424.8 R, 424 NA; 267/64.26, 64.13; 188/290, 322.12, 287, 266, 322.14, 321.11; 464/173; 254/276, 331, 260, 361, 364, 386; 192/140, 141

[56] References Cited

U.S. PATENT DOCUMENTS

| | | |
|---|---|---|
| 3,512,739 | 5/1970 | Powell et al. ........................ 188/64.13 |
| 3,762,227 | 10/1973 | Bohnhoff ............................... 74/89.15 |
| 4,392,390 | 7/1983 | Johnson .............................. 464/173 X |
| 4,515,085 | 5/1985 | Rohrbach .............................. 74/568 R |
| 4,598,238 | 7/1986 | Scarano ........................... 74/424.8 NA |
| 5,031,732 | 7/1991 | Batek et al. ....................... 188/322.12 |
| 5,090,513 | 2/1992 | Bussinger . | |
| 5,485,760 | 1/1996 | Lange ....................................... 74/459 |

*Primary Examiner*—Rodney H. Bonck
*Assistant Examiner*—Marcus Charles
*Attorney, Agent, or Firm*—Reising, Ethington, Learman & McCulloch, PLLC

[57] ABSTRACT

A method and apparatus wherein a travel limit/dampening device is coupled to the end of a screw of a linear ball screw actuator device for limiting the travel of an actuator extension coupled to a nut supported for linear driven displacement in either direction along the screw. The travel limit/dampening device includes a gas shock supported within a double acting reaction device reactive axially between the nut and screw when the extension is fully retracted and extended, respectively, to collapse the shock absorber and thereby dampen the movement of the extension at each end of its stroke.

21 Claims, 4 Drawing Sheets

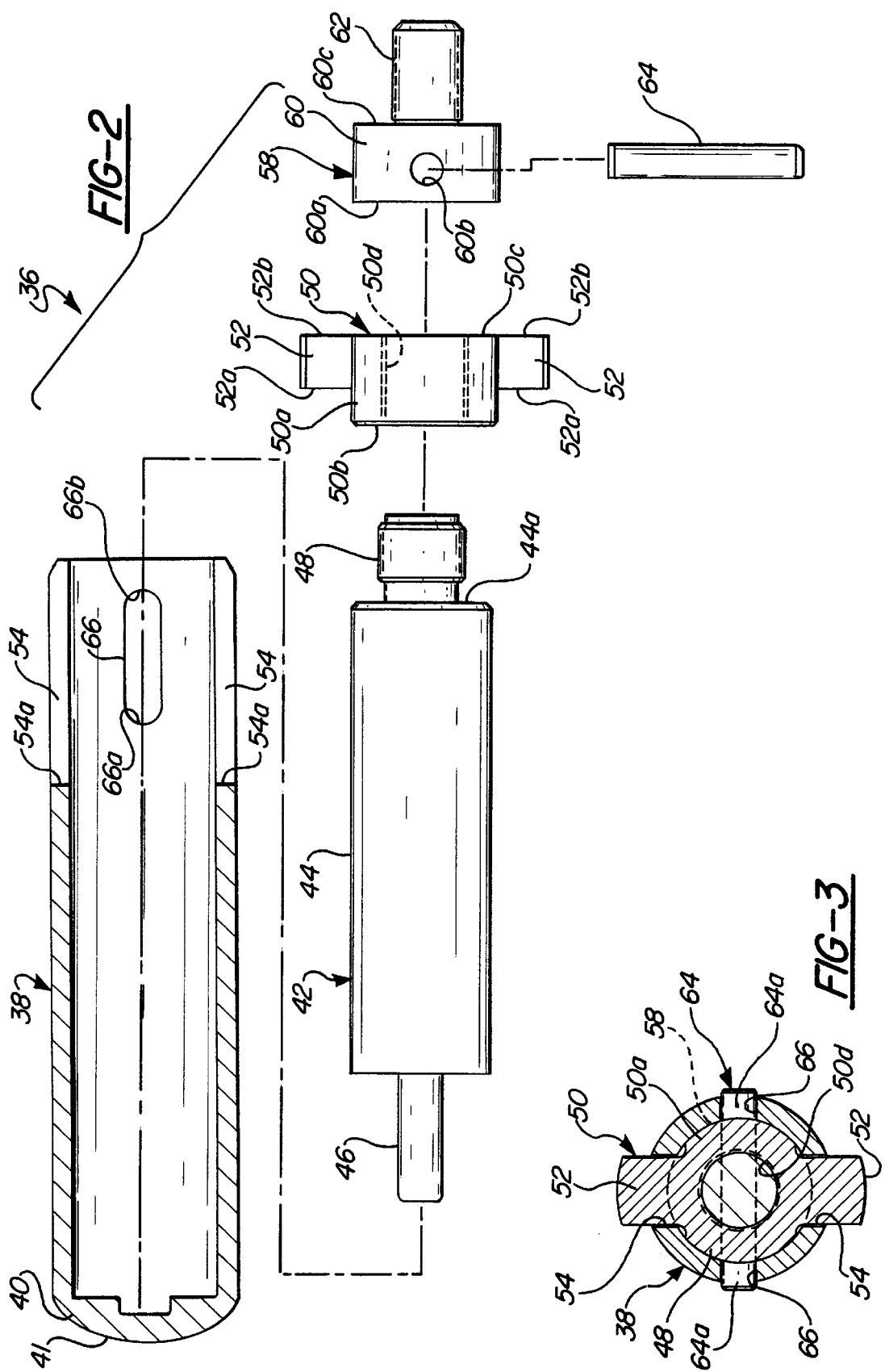

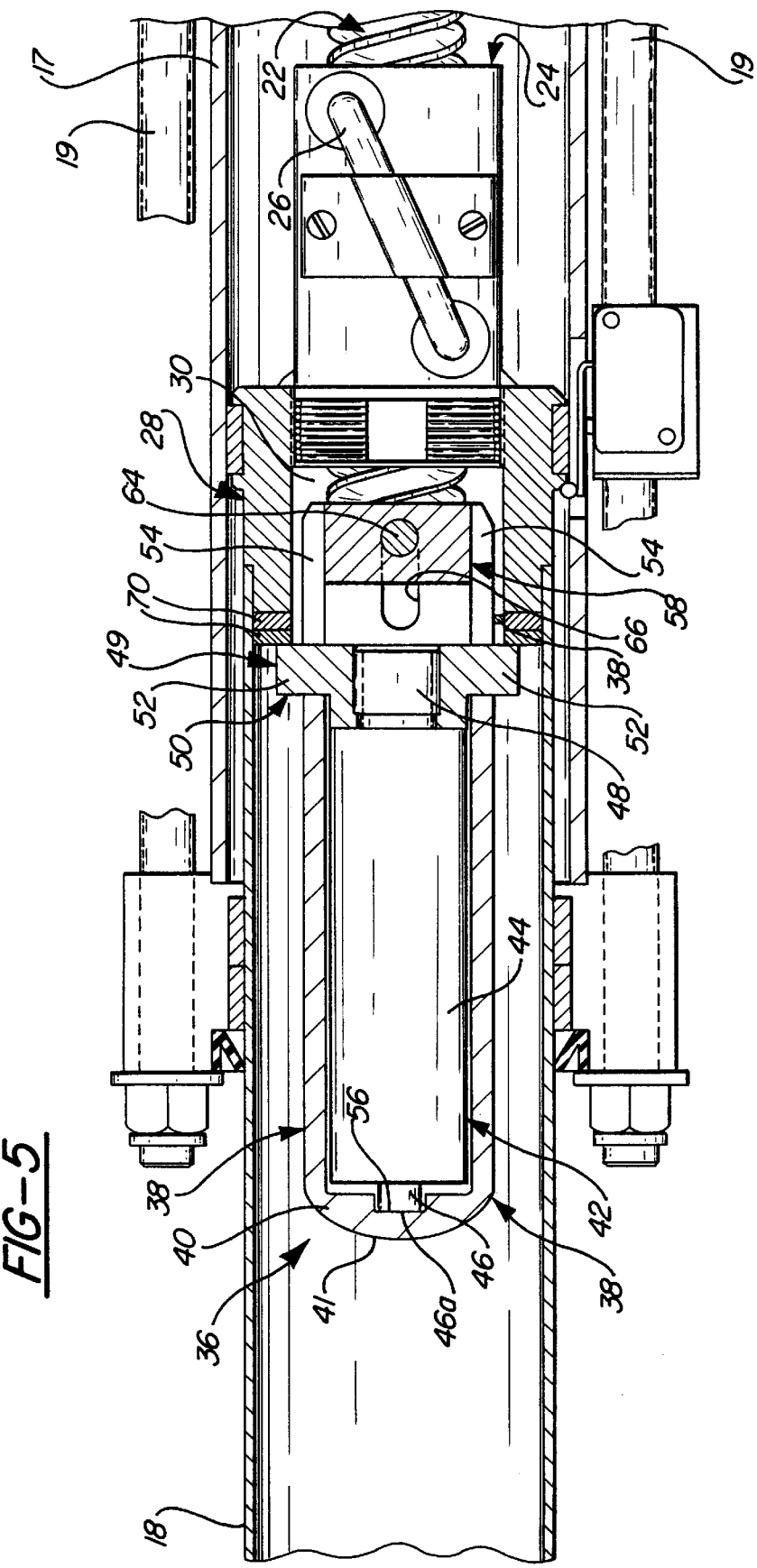

BALL SCREW AND NUT LINEAR ACTUATOR ASSEMBLIES AND METHODS OF CUSHIONING THEIR TRAVEL

This application claims Benefit of Provisional Application Ser. No. 60/014,835, filed Apr. 4, 1996.

This invention particularly relates to ball screw and nut assemblies which are useful as linear actuators.

BACKGROUND OF THE INVENTION

Linear ball screw-type actuators are used in many applications to transmit linear motion in performing such operations as opening and closing, raising and lowering, pushing and pulling, advancing and retracting, and positioning various devices. In these devices a screw is typically supported within a relatively telescoping inner and outer tube for rotation by a motor and gear box assembly. A ball nut is mounted on the screw and coupled to the slidable inner tube, converting the rotary motion of the motor and screw to linear motion of the inner tube. The inner tube carries a clevis or other connector at its free end which is coupled to the device to be actuated.

Generally, stop washers or pins are provided on the screw at its opposite ends to halt the travel of the ball nut along the screw, thereby establishing fully extended and retracted inner tube stroke limits. The sudden stoppage of the ball nut as it impacts such stops imparts a jolting shock force to the actuator parts, which can be considerable, particularly when the actuator is under heavy load.

SUMMARY OF THE INVENTION AND ADVANTAGES

The present invention overcomes the foregoing objections by incorporating cushioning mechanism with the actuator that absorbs the energy of impact as the actuator reaches its fully extended and retracted positions, thus greatly reducing or eliminating the jolting forces applied.

One of the prime objects of the invention is to provide a novel method of cushioning the impact of a sudden stop on a payload at either end of an electro-mechanical actuator and collapsing the shock forces imposed, particularly on high speed, high load actuators.

Another object of the cushioning device is to obviate the need for the stop washers or stop pins, which cause the sudden impact forces.

A further object of the invention is to provide a single cushioning device which serves to cushion the travel of the actuator in both the fully retracted and extended positions.

Still another object of the invention is to provide a cushioning device designed to be mounted on the end of the screw for confronting an end wall of the inner tube when fully retracted, and confronting the ball nut when the inner tube is fully extended.

Still another object of the invention is to provide a simple, practical and durable cushioning device that can be readily adapted to present actuator designs without significant modification of their construction.

Another object of the invention is to provide a cushioning device that is self contained and detachable from the actuator to facilitate repair or replacement, when needed.

These and other objects, advantages and features of the present invention will become more readily apparent from the following detailed description when taken together with the accompanying drawings, wherein:

BRIEF DESCRIPTION OF THE DRAWINGS

FIG. 2 is a partly sectional, exploded view of the components that make up the cushioning device;

FIG. 3 is an enlarged cross-sectional view taken along the lines 3—3 of FIG. 1; and FIGS. 4 and 5 are enlarged fragmentary sectional views showing the actuator in its fully retracted and extended positions, respectively.

DETAILED DESCRIPTION

Figure 1:
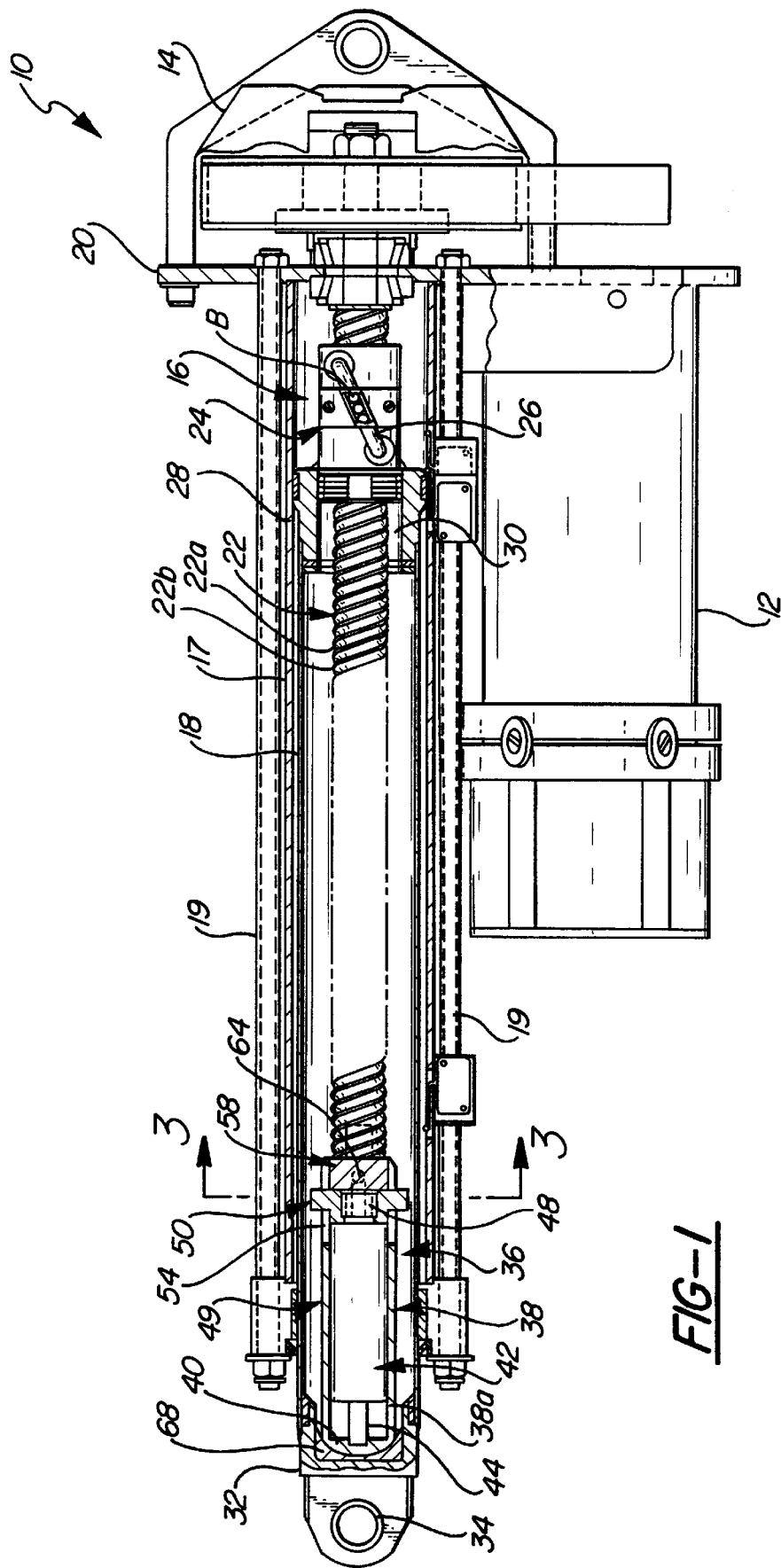
FIG. 1 is a partly sectional, elevational view of a typical ball screw actuator fitted with a travel stop cushioning device which is constructed in accordance with a presently preferred embodiment the invention.

With reference to FIG. 1 initially, there is illustrated an electro-mechanical linear actuator assembly 10 having an electric motor 12, gearbox 14, and a ball nut and screw mechanism, generally indicated at 16, housed within a fixed outer tube 17 which is secured by nut and bolt fasteners 19 to a base plate 20 of the actuator 10.

The mechanism 16 includes a typical ball screw 22 provided with helical ball-accommodating groove portions 22a separated by helical land portions 22b. Coaxially provided on the screw 22, is a ball nut 24 which has matching internal groove and land portions and is provided with an exterior ball return tube 26 to recirculate a train of abutting load bearing balls B to facilitate linear movement of the ball nut 24 along the ball screw 24 in response to rotation of the screw 22. Such a mechanism is disclosed, for example, in U.S. Pat. No. 5,485,760, which is owned by the assignee of the present invention and its disclosure incorporated herein by reference.

The nut 24, at the time of fabrication, is provided with an integrated cylindrical extension portion, generally designated 28, which is arranged in concentric spaced relation to the screw 22 to define an annular recess 30 therebetween. An inner extension tube 18 is fixed at its inner end to the extension portion 28 of the nut 24 and extends longitudinally therefrom to an opposite free end on which a clevis 32 or other connector may be mounted. The clevis 32 is shown as having an attachment opening 34 for connection to the device to be actuated (not shown) in the conventional manner.

A ball screw mounted travel limit/dampening device constructed in accordance with a presently preferred embodiment of the invention is designated generally at 38 in the drawings and comprises a carrier such as a cylindrical housing, cage, support, or container 38a which is closed at one end by an end wall or activating wall or end part 40 and which is open at its opposite end.

A conventional shock absorber or compressible shock absorbing device, generally designated 42, includes a cylinder 44 in which fluid such as a compressible gas is contained, and a relatively slidable plunger 46, which normally is in the extended FIG. 2 position, has relative movement with the cylinder 44 to displace the fluid and absorb an applied force. The plunger 46 is automatically returned outwardly by the usual compression spring in cylinder 44 (not shown) upon removal of the applied force. A fixed, externally threaded adapter 48 forms a part of and is fixed to the interiorly positioned end of the cylinder 44, as illustrated best in FIG. 2. The shock absorber 42 preferably is a self-contained unit available commercially from Endine Company, model number FP3984. The shock absorber or cushioning device 42 of which many forms are available, is housed within a double acting, cylinder carrying reaction carrier or enclosure 49 which operates in conjunction with the extension tube 18, and nut 24 to limit the travel of the nut extension tube 18 while dampening the sudden stoppage of the nut extension tube 18 at each end of its stroke as will be described in greater detail below.

A shock absorber guide 50 is coupled to adaptor 48 to function as a part thereof and includes a cylindrical body 50a (FIG. 3) having an outer diameter corresponding generally to that of the fluid cylinder 44, opposing inner and outer end faces 50b, 50c, and an internally threaded, axial bore 50d. A guide part comprising a pair of diametrically opposed wings, ears, or reaction arms 52 project radially outwardly of the body 50a, presenting forward 52a and rearward 52b facing abutment surfaces. The guide 50 is preferably fabricated from a hard, wear-resistant material, such as SAE 4340H, 4140, 4190 or 6150 grades of steel, hardened and tempered typically to Rc 38–40.

The shock guide 50 is mounted securely but removably on the end of the shock absorber 42 by threading the externally threaded adapter 48 into the threaded bore 50d of the guide 50, until the inner end face 50b of the guide 50 is brought to bear tightly against the opposing end face 44a of the fluid cylinder 44. Once connected, the shock absorber 42 and guide 50 are inserted as a unit, (plunger 46 first) into the shock absorber carrier or housing 38.

The shock housing 38 is formed with a guide part comprising a pair of first open-ended, diametrically opposed longitudinal guide slots 54 that are arranged and dimensioned to slidably accommodate the ears 52 of the shock guide 50, and which terminate within the housing 38 at closed abutment ends 54a. As most clearly seen in FIG. 3, the ears 52 of the shock guide 50 extend radially outwardly beyond the outer peripheral surface of the shock housing 38. The end wall 40 of the housing 38 is also formed on its interior side with a central recessed seat 56 in which the free end 46a of the plunger 46 is accommodated.

A guide mount for guide 50, generally designated 58, has a generally cylindrical body 60 formed with a flat inner end face 60a and a transverse bore 60b extending diametrically through the body 60. An externally threaded mounting stud 62 projects from an opposite outer end face 60c of the body 60. The body 60 of the guide mount 58 is received in the open end of the shock housing 38, such that the inner end face 60a confronts the outer end face 50c of the shock guide 50. The guide mount 58 is likewise fabricated of a hard, wear-resistant material and preferably the same materials as those used for the shock guide 50, hardened and tempered typically to Rc 38–40.

The guide mount 58 is retained within the housing 38 by means of a hardened, ground dowel pin 64, extending through the opening 60b in the guide mount and having ends 64a thereof projecting outwardly through diametrically opposed second slots 66 formed in the housing 38 (FIG. 3). The structure provides a pin and slot lost motion connection. The slots 66 are preferably 90° offset from the guide slots 54 and extend longitudinally (FIG. 2) between forward 66a and rearward 66b closed marginal slot ends. It should be noted at this time that the relative dimensions of the components are such that the shock absorber 42 must be compressed somewhat during assembly in order to extend the opening 60b of the guide mount 58 sufficiently inward to register it with the rearward ends 66b of the slots 66 to enable insertion of the pin 64 into the opening 60b through one of the slots 66. Once the dowel pin 64 is in place, it is urged by the return force of the shock absorber 42 against the rearward interior ends 66b of the slots 66 so as to retain the components of the device 36 securely but removably in assembled relation as a self-contained unit.

As illustrated in FIG. 1, the free end of the ball screw 22 is formed with a threaded axial bore 67. The stud 62 of the guide mount 58 which essentially functions as a part of screw 22 is threaded into the bore 67 until the end face 60c of the guide mount is brought to bear tightly against the end face 22a of the screw 22, thereby mounting the dampening device 36 securely but removably on the screw 22.

A pair of wear washers 70 (FIG. 5) are arranged within the inner tube 18, resting against the end face of the extension portion 28. They are freely rotatable relative to the portion 28 and to one another. The washers 70 are preferably fabricated of a hard, wear-resistant material such as SAE 4150H or 6150 steel typically hardened and tempered to Rc 55–60. By use of the wear washers 70, the extension portion 28 can be fabricated of a milder, less costly grade of steel.

THE OPERATION

The electric motor 12 activates the ball screw 22 through gearing inside the gear box 14 in known manner, causing the ball screw, and hence the dampening device 36, to rotate. U.S. Pat. No. 5,090,513 illustrates typical gearing and is incorporated herein by reference. The ball nut 24 converts the rotary motion of the screw 22 into linear motion of the inner tube 18 to either extend or retract the inner tube.

FIG. 1 illustrates the inner tube in a position just prior to full retraction where the dampening device 36 comes into play. As the inner tube 18 is moved inwardly, a clevis wall 43 confronts the end wall 40 of the shock housing 38, and continued inward advancement displaces the shock housing 38 inwardly (to the right in FIGS. 1 and 4) relative to the fluid cylinder 44, shock guide 50, and guide mount 58, bringing the ears 52 and dowel pin 64 relatively forwardly in their associated slots 54, 66. It should be noted at this point that the end wall 40 has a preferably convex outer surface 41 which seats in the corresponding concave recess 43 of the clevis 32 to maintain concentricity. The confronting surfaces of the end wall 40 and clevis 32 are hardened to resist wear. It is advantageous to form the concave portion 43 of the clevis 32 as a separate insert 68 (FIG. 4) of the same material and hardness as that of the end wall 40. The insert 68 may be joined by welding or other suitable securing means to the clevis 32, as illustrated best in FIG. 4. The relatively large radius of the concavity not only provides a greater contact surface, it also performs a centering function to maintain concentricity of the parts as the shock forces are collapsing.

Figure 4:
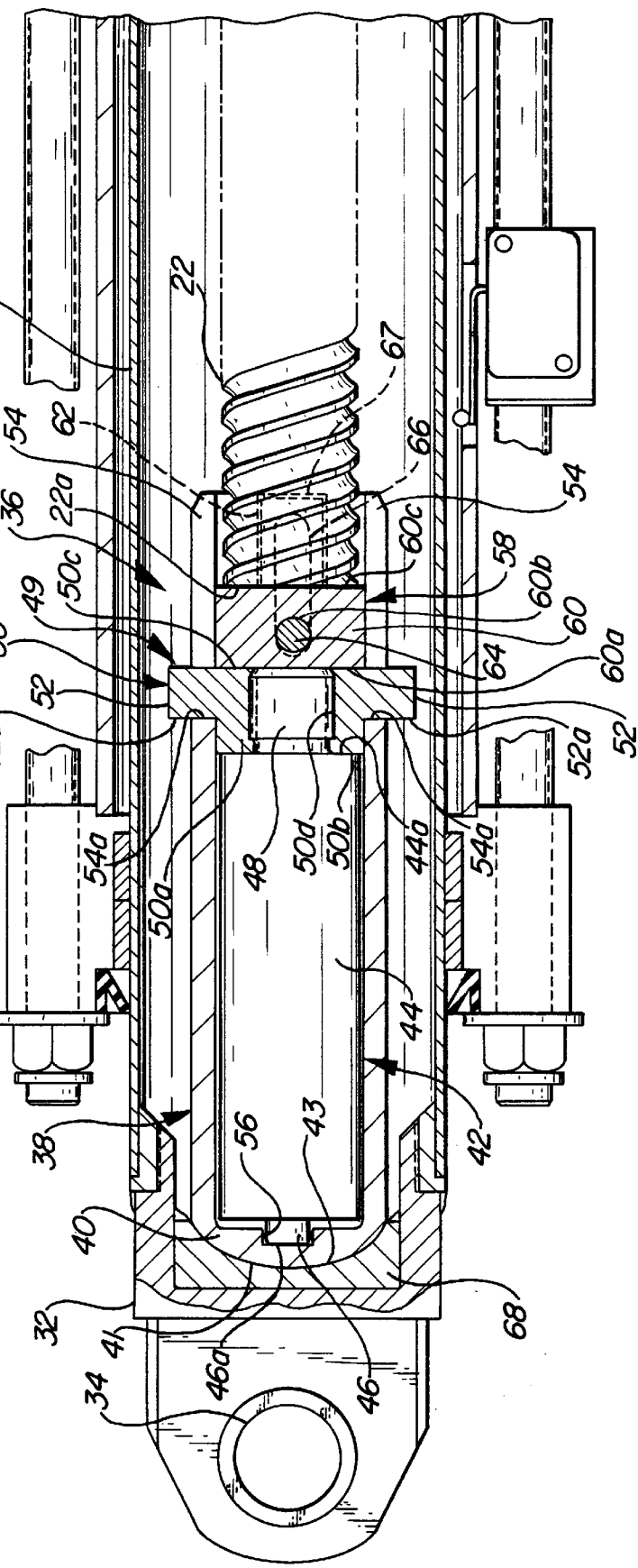

The inward displacement of the shock housing 38 forces the plunger 46 further into the cylinder 44, thereby dampening the energy of the impact between the housing 38 and clevis 32. Full cushioned retraction is reached when the base walls 54a of the guide slots 54 bottom out against the forward abutment surfaces 52a of the ears 52, as illustrated in FIG. 4. The cushioning device thus prevents material impact forces from being transmitted to the screw 22 and nut 24.

At the other extreme (FIG. 5), driving the inner tube 18 to full extension causes the extension wall portion 28 of the ball nut 24 to move toward the rearward abutment surfaces 52b of the shock guides ears 52.

As the wear washers 70 confront the rearward abutment surfaces 52b of the shock guide ears 52, the shock guide 50 is driven outwardly by continued advancement of the nut 24 (to the left in FIG. 5) relative to the shock housing 38, which is held against movement by engagement of the dowel pin 64 with the rearward ends 66b of the slotted openings 66 (see FIG. 5). The advancement of the nut wall portion 28 is accommodated by the accommodation of the rearward end of the shock housing 38 in the recess 30 of the extension 28.

The shock of the confronting surfaces is fully cushioned as previously by the shock absorber 42 as the normally projecting, gas pressure retained plunger 46 is displaced relative to the cylinder 44. Full, but cushioned, extension is achieved when the forward abutment surfaces 52a of the ears 52 confront the base walls 54a of the guide slots 54.

It is understood that the disclosed embodiment is representative of a presently preferred form of the invention and is intended to be illustrative rather than definitive thereof. Other embodiments which accomplish the same function are contemplated herein within the scope of the claims. For example, the invention is not limited to the particular ball screw actuator described nor to the particular screw drive arrangement. Furthermore, while the guide mount 58 is described in the preferred embodiment as being threaded into engagement with the ball screw 22, it will be appreciated that other ways of attaching the dampening device 36 to the screw 22 are contemplated by the invention which include, for example, permanently fixing the guide mount 58 to the screw 22 such as by welding. Moreover, the materials and physical properties of the components described are those presently preferred, but others are contemplated.

I claim:

1. In a linear ball screw actuator assembly having a rotatable axially extending drive screw with exterior helical ball accommodating grooves and an axially inner and outer end, a nut arranged about said screw to cooperate with said screw to provide a raceway, at least one circuit of load bearing balls recirculating in said raceway between said screw and said nut to convert rotary motion of said screw to linear displacement of said nut in each axial direction along said screw, and an extension device arranged coaxially about said screw having an axially outward generally radial end part extending beyond said outer end of said screw and fitted with a connector for attachment to a mechanism to be actuated, said extension device having an inward end coupled to said nut for linear axial movement therewith relative to said screw between a fully extended stroke position and a fully retracted stroke position, wherein the improvement comprises:

a shock absorbing device, comprising a sealed gas absorber cylinder with a relatively collapsible plunger, relatively axially slideably received in an axially non-collapsible carrier device having an axial lost motion connection with said outer end of said screw mounted on said screw and operative to relatively collapse said plunger and cylinder and absorb energy as said extension device approaches both said fully extended and fully retracted positions in order to cushion the sudden stoppage of said extension device at each end of its stroke.

2. The assembly of claim 1 wherein said carrier device includes a tubular housing accommodating said shock absorber and having an axially closed outer end and an axially open inner end.

3. The assembly of claim 1 wherein said plunger extending from one end of said cylinder has a free end confronting said outer end part of said shock housing.

4. The assembly of claim 3 wherein said housing includes including a shock guide coupled to said cylinder for axial travel and having a pair of diametrically opposed reaction arms extending radially outwardly of said cylinder through corresponding diametrically opposed axially extending first guide slots in said shock housing.

5. The assembly of claim 4 wherein said first guide slots are open to said open end of said shock housing and closed at their opposite ends.

6. The assembly of claim 5 wherein said shock absorber device includes a guide mount mounted by said screw.

7. The assembly of claim 6 wherein said lost motion connection includes a pair of elongate diametrically opposed axial second slots formed in said shock housing, and a pin carried by said guide mount having opposite ends thereof projecting radially outwardly of said guide mount through said second slots in said housing.

8. The assembly of claim 7 wherein said plunger of said shock absorber is biased outwardly in axial prolongation of said cylinder to normally urge said closed end of said shock housing forwardly with said first slots out of axial engagement with said reaction arms of said shock guide, and the inner ends of said second slots into confronting axial engagement with said pin.

9. The assembly of claim 8 wherein said shock housing has a forward facing external abutment surface on said closed end thereof and said extension device includes a corresponding rearward facing internal abutment surface on its closed end constituting said end part, said abutment surface of said extension device confronting said abutment surface of said shock housing as said extension device approaches said fully retracted position causing said shock housing and said plunger to move axially with said extension device relative to said cylinder and bring said closed end of said guide slot into confronting engagement with said reaction arms of said shock guide to define said fully retracted position of said extension device and during such displacement of said shock housing forcing said plunger of said shock absorber into said cylinder to dampen such movement of said extension device to said fully retracted position.

10. The assembly of claim 9 wherein said closed ended second slots of said shock housing are displaced axially with said shock housing relative to said pin.

11. The assembly of claim 9 wherein said external abutment surface of said shock housing and said internal abutment surface of said closed end of said extension device have complementing convex and concave shapes, respectively, to accommodate rotation and coaxial alignment of said shock housing relative to said extension device.

12. The assembly of claim 9 wherein said reaction arms of said shock guide provide a rearward facing abutment surface and said nut carries a corresponding forward facing abutment surface, said abutment surface carried on said nut being arranged to confront said abutment surface of said reaction arms as said extension device approaches said fully extended position, causing said shock guide and said cylinder to be forwardly displaced relative to said guide mount and said shock housing and bring said reaction arms into confronting engagement with said closed end of said guide slot to define said fully extended travel of said extension device, said displacement of said cylinder forcing said plunger into said cylinder to dampen such movement of said extension device.

13. The assembly of claim 12 wherein said abutment surface associated with said nut comprises a pair of freely rotatable wear washers arranged about said screw between said nut and said reaction arms of said shock guide.

14. The assembly of claim 12 wherein said pin holds said housing against forward axial movement during said forward displacement of said cylinder and said guide mount.

15. The assembly of claim 1 wherein said shock absorber device comprises a self-contained unit separable from said screw.

16. A shock absorbing device for dampening end stroke movement of a linear ball screw actuator comprising:

a shock absorber having a fluid cylinder and a plunger projecting from one end of said cylinder which is biased outwardly;

a shock housing closed at one end and open at an opposite end, said shock housing being formed with a first pair of diametrically opposed guide slots that extend axially from said open end of said housing to a closed end, said shock housing being formed with a second pair of diametrically opposed axial slots angularly offset from said first pair of slots, said shock absorber being accommodated within said housing with a free end of said plunger engaging said closed end of said housing;

a shock guide mounted on said cylinder adjacent its opposite end, said shock guide including a pair of diametrically opposed reaction arms projecting radially outwardly of said cylinder through said first pair of guide slots in said housing; and a guide mount adjacent said shock guide having an attachment for connecting said guide mount to a linear actuator screw, said guide mount including pin projections extending through said second pair of slots in said housing.

17. A method of dampening end stroke travel of a ball screw linear actuator having; (i) an axially extending ball screw with external helical ball accommodating groove portions supported at one end for driven rotation by a motor and having an opposite end, (ii) a nut carried coaxially about the screw and cooperating with said ball screw to provide at least one raceway with load bearing balls to convert rotary motion of the screw into axial displacement of the nut in either direction along the screw; and (iii) a nut extension actuator provided for the nut for axial movement therewith between a fully extended stroke position and a fully retracted stroke position, said method comprising the steps of:

mounting a dampening device to the opposite end of the screw, the dampening device having a non-compressible shock absorber cylinder with a collapsible part, said dampening device further having axially non-collapsible, axially displaceable reaction mechanism aligned axially with said collapsible part and reactive axially relative to said screw as the nut extension actuator approaches both the fully retracted and fully extended stroke positions, respectively to compress the collapsible part, thereby cushioning the sudden stoppage of the extension actuator at each end of its stroke.

18. A ball screw linear actuator comprising:

a rotary motor;

a screw coupled at one end to said motor for driven rotation and extending therefrom to an opposition outer end, said screw having exterior helical groove portions separated by land portions;

a nut arranged coaxially about said screw, said screw and nut being configured to provide a recirculating raceway accommodating at least one circuit of load bearing balls for converting rotary motion of said screw to linear displacement of said nut in either direction along said screw;

an extension actuator provided at one end of said nut to extend axially therefrom to an opposite outer end, fitted with a connector for attachment to a mechanism to be actuated, said extension actuator being movable with said nut between a fully extended end stroke position in which said opposite end of said extension actuator is extended substantially beyond said opposite end of said screw and a fully retracted end stroke position in which said opposite end of said extension actuator is positioned adjacent said opposite end of said extension actuator is positioned adjacent said opposite end of said screw; and a shock absorbing device mounted on said opposite end of said screw and including (a) a compressible shock absorber and (b) a double acting, axially non-compressible, axially displaceable reaction mechanism reactive axially relative to said screw to compress said shock absorber in response to moving said extension to either of said end stroke positions to thereby cushion the sudden stoppage of said extension actuator at each end of its stroke.

19. The actuator of claim 18 wherein a tubular container, functioning as said reaction mechanism, has an outer end wall and said nut extension actuator has an activating wall axially outboard thereof; and in one end stroke position said reaction mechanism is axially reactive between said container end wall and screw upon said container end wall being engaged by said nut extension activating wall.

20. The method of claim 17 including providing said reaction mechanism with a pin and axial slot connection for mounting to said screw and positioning said gas shock absorber relative to said reaction mechanism such that the pin of said pin and slot connection is normally interjacent the ends of the slot of the pin and slot connection when the nut extension actuator is interjacent the ends of its stroke.

21. A shock absorbing device for dampening end stroke movement of a linear ball screw actuator, having a rotatable, axially restrained screw and axially movable, rotatably restrained nut with an actuator extension thereon, in both directions comprising:

a shock absorber having a cylinder and a depressible plunger projecting from one end of said cylinder which is biased outwardly;

a cylinder carrier having a radially extending end part and an open end for receiving said cylinder, said cylinder being received therein with a free end of said plunger in alignment with said radially extending part and having an axially slidably mounted shock guide with a reaction arm mechanism extending radially fixed to the opposite end of said cylinder; and a guide mount having an attachment for connecting it to said screw and mounted to said carrier with a pin and axial slot connection for thereby mounting said carrier for lost motion travel on said screw.

* * * * *

UNITED STATES PATENT AND TRADEMARK OFFICE
CERTIFICATE OF CORRECTION

PATENT NO. : 5,868,032
DATED : February 9, 1999
INVENTOR(S) : David Ray Laskey

It is certified that error appears in the above-indentified patent and that said Letters Patent is hereby corrected as shown below:

Column 5, line 61, delete "including".

Column 7, line 51, change "opposition" to -- opposite --.

Column 8, bridging lines 10 and 11, delete "extension actuator is positioned adjacent said opposite end of said".

Signed and Sealed this

Thirteenth Day of July, 1999

Attest:

Attesting Officer

Q. TODD DICKINSON

Acting Commissioner of Patents and Trademarks